(12) United States Patent
Noguchi et al.

(10) Patent No.: US 10,464,842 B2
(45) Date of Patent: Nov. 5, 2019

(54) ANTIFOULING STRUCTURE AND AUTOMOBILE COMPONENT PROVIDED WITH SAID ANTIFOULING STRUCTURE

(71) Applicant: NISSAN MOTOR CO., LTD., Yokohama-shi, Kanagawa (JP)

(72) Inventors: Yuji Noguchi, Kanagawa (JP); Ryo Murakami, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/301,849

(22) PCT Filed: May 20, 2016

(86) PCT No.: PCT/JP2016/065007
§ 371 (c)(1),
(2) Date: Nov. 15, 2018

(87) PCT Pub. No.: WO2017/199423
PCT Pub. Date: Nov. 23, 2017

(65) Prior Publication Data
US 2019/0152846 A1    May 23, 2019

(51) Int. Cl.
*C03C 17/42* (2006.01)
*B60R 13/00* (2006.01)
(Continued)

(52) U.S. Cl.
CPC ............... *C03C 17/42* (2013.01); *B32B 5/18* (2013.01); *B60R 13/00* (2013.01); *C08J 7/06* (2013.01);
(Continued)

(58) Field of Classification Search
CPC ............... C03C 17/42; C03C 2218/116; C03C 2217/76; C03C 2218/113; C09D 7/20;
(Continued)

(56) References Cited

U.S. PATENT DOCUMENTS

2013/0032316 A1   2/2013   Dhiman et al.
2013/0034695 A1   2/2013   Smith et al.
(Continued)

FOREIGN PATENT DOCUMENTS

JP   2014-509959 A   4/2014
JP   2014-531989 A   12/2014
(Continued)

OTHER PUBLICATIONS

Wong et al. "Bioinspired self-repairing slippery surface with pressure-stable omniphobicity." Nature 477, 443-447 (Sep. 22, 2011). doi:10.1038/nature10447 (Year: 2011).*

*Primary Examiner* — Nancy R Johnson
(74) *Attorney, Agent, or Firm* — Foley & Lardner LLP

(57) ABSTRACT

An antifouling structure of the present invention includes a microporous layer and an antifouling liquid on a base.
The microporous layer includes a liquid retaining portion that is formed at a surface part of the microporous layer, and a liquid ejecting portion that is formed at an inner part of the microporous layer and has a lower affinity for the antifouling liquid than the liquid retaining portion. The film thickness of the liquid retaining portion is within the range of 1/100 to 1/50 of the liquid ejecting portion, where T is the film thickness of the liquid ejecting portion.

9 Claims, 2 Drawing Sheets

(51) Int. Cl.
  *C09D 7/20* (2018.01)
  *C09D 7/61* (2018.01)
  *C09D 7/63* (2018.01)
  *B32B 5/18* (2006.01)
  *C08J 7/06* (2006.01)

(52) U.S. Cl.
  CPC ............... *C09D 7/20* (2018.01); *C09D 7/61* (2018.01); *C09D 7/63* (2018.01); *C03C 2217/76* (2013.01); *C03C 2218/113* (2013.01); *C03C 2218/116* (2013.01)

(58) Field of Classification Search
  CPC ... C09D 7/61; C09D 7/63; B60R 13/00; C08J 7/06; B32B 5/18
  See application file for complete search history.

(56) References Cited

U.S. PATENT DOCUMENTS

| | | |
|---|---|---|
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2017/0015835 A1 | 1/2017 | Aizenberg et al. |
| 2018/0127594 A1 | 5/2018 | Aizenberg et al. |
| 2018/0180364 A1 | 6/2018 | Dhiman et al. |
| 2018/0187022 A1 | 7/2018 | Aizenberg et al. |

FOREIGN PATENT DOCUMENTS

| | | |
|---|---|---|
| JP | 2015-063061 A | 4/2015 |
| JP | 2015-066849 A | 4/2015 |
| WO | WO-2008/120505 A1 | 10/2008 |
| WO | WO2015/145703 A1 | 10/2015 |
| WO | WO-2015/155830 A1 | 10/2015 |

* cited by examiner

ANTIFOULING STRUCTURE AND AUTOMOBILE COMPONENT PROVIDED WITH SAID ANTIFOULING STRUCTURE

TECHNICAL FIELD

The present invention relates to an antifouling structure that comprises a microporous layer retaining antifouling liquid, in more detail to an antifouling structure that has ability of both retaining the antifouling liquid in the microporous layer and supplying the antifouling liquid to the surface and that forms an antifouling surface having a self-restoring property for a long time, and to an automobile part with the antifouling structure.

TECHNICAL FIELD

There have been articles that has a slippery surface with antifouling effect. For example, Patent Document 1 discloses a water-repellent article in which a water-repellent material is retained in a microporous layer made of silica sol and a fluorine resin. The water-repellent article maintains high slipperiness of water droplets even after it is irradiated with ultraviolet ray for a long time or the surface is worn away.

CITATION LIST

Patent Document

Patent Document 1: WO2008/120505A

SUMMARY OF INVENTION

Technical Problem

However, the article in Patent Document 1 contains the fluorine resin over the entire microporous layer. While the microporous layer has high affinity for the water-repellent material and can retain a lot of water-repellent material, the water-repellent material in the microporous layer is poorly supplied to the surface of the microporous layer. Since the water-repellent material cannot be effectively used, the water-repellent performance may sometimes be decreased.

If the microporous layer had low affinity for the water-repellent material, it could not retain a sufficient amount of water-repellent material.

The present invention has been made in view of the above-described problem in the prior art, and an object thereof is to provide an antifouling structure that has capability of both supplying an antifouling liquid to a surface of an antifouling structure and retaining the antifouling liquid in the antifouling structure and that forms an antifouling surface having a self-restoring property for a long time, and an automobile part with the antifouling structure.

Solution to Problem

As a result of keen study for achieving the above-described object, the present inventors found that an antifouling liquid in the microporous layer is readily supplied to the surface by providing a liquid retaining portion and a liquid ejecting portion that are layered in the thickness direction of the microporous layer and have different affinity for the antifouling liquid, in which the liquid retaining portion in the surface has higher affinity for the antifouling liquid and has a suitable film thickness. The present invention was thus completed.

That is, the antifouling structure of the present invention comprises the microporous layer and the antifouling liquid on a base.

The microporous layer comprises the liquid retaining portion that is formed at a surface part of the microporous layer and the liquid ejecting portion that is formed at an inner part of the microporous layer and has lower affinity for the antifouling liquid than the liquid retaining portion, in which the film thickness of the liquid retaining portion is within the range of 1/100 to 1/50 of the film thickness (T) of the liquid ejecting portion.

The automobile part of the present invention comprises the above-described antifouling structure.

Advantageous Effects of Invention

In the present invention, the liquid ejecting portion having suitably low affinity for the antifouling liquid is provided at an inner part of the microporous layer retaining the antifouling liquid. Therefore, it is possible to provide the antifouling structure that has capability of both supplying the antifouling liquid to the surface of the antifouling structure and retaining the antifouling liquid and which can form an antifouling surface having a self-restoring property for a long time.

DESCRIPTION OF EMBODIMENT

The antifouling structure of the present invention will be described in detail.

Figure 1:
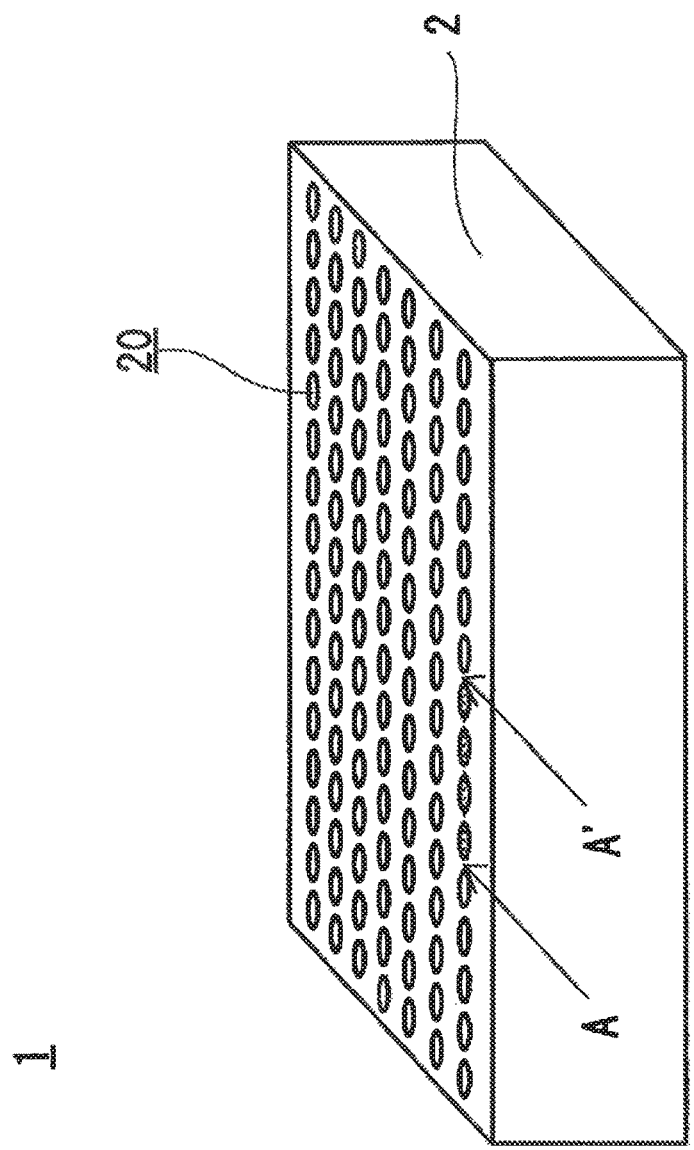
FIG. 1 is a schematic perspective view of an example of the antifouling structure of the present invention.
Figure 2:
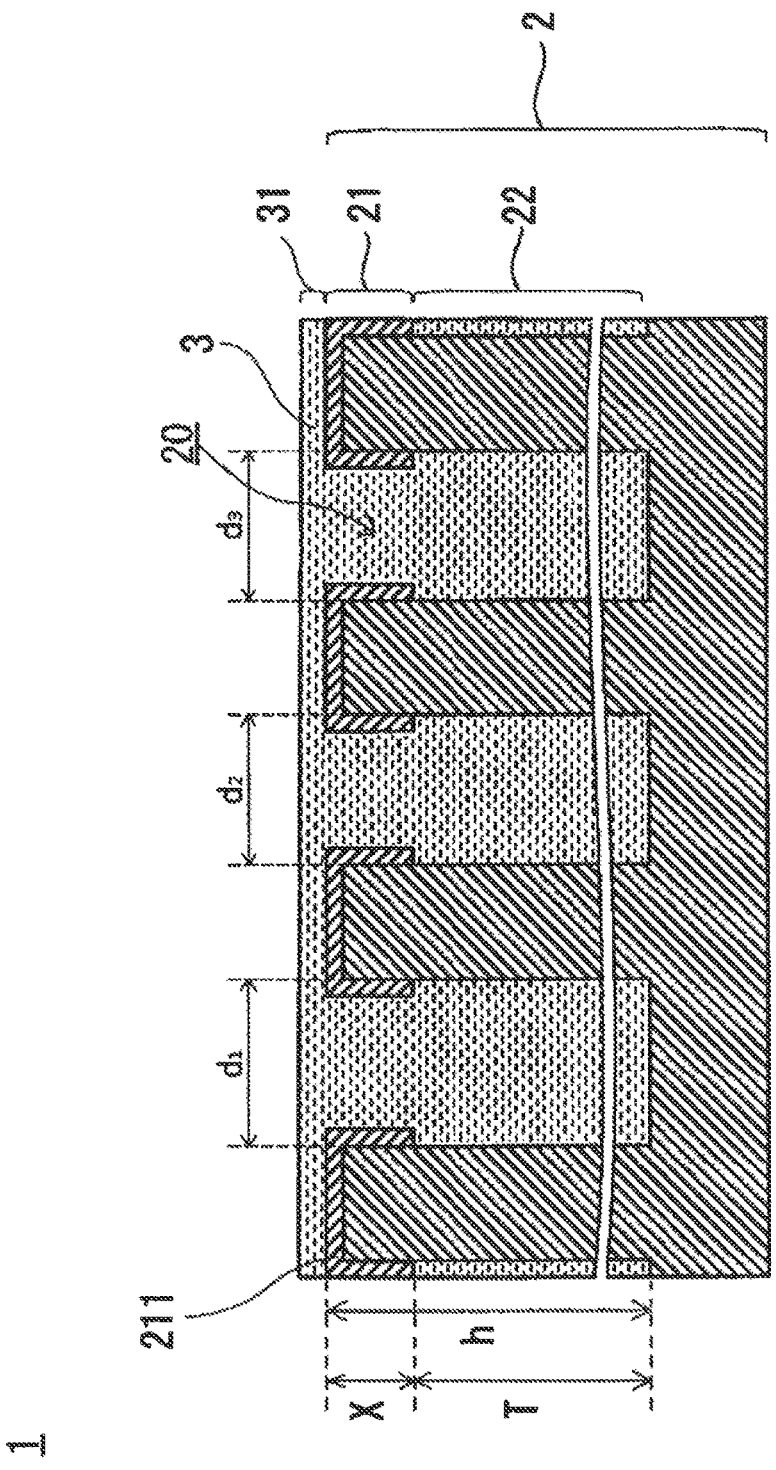
FIG. 2 is a schematic cross-sectional view of the antifouling structure in FIG. 1 taken along A-A'.

FIG. 1 is a perspective view of the antifouling structure of the present invention. FIG. 2 is a schematic cross-sectional view taken along A-A' in FIG. 1.

In FIG. 1 and FIG. 2, the antifouling structure, a microporous layer, pores, a liquid retaining portion, a liquid ejecting portion, a surface modified layer, antifouling liquid and an antifouling film are denoted respectively as 1, 2, 20, 21, 22, 211, 3 and 31.

The antifouling structure of the present invention comprises the microporous layer with the micropores and the antifouling liquid covering the surface of the microporous layer. The antifouling liquid is retained in the pores of the microporous layer, which exudes from the pores to the surface of the microporous layer to form the antifouling film.

Microporous Layer

The microporous layer 2 comprises the liquid retaining portion 21 that is formed in a film shape at a surface part and the liquid ejecting portion 22 that is formed in a film shape at an inner part and has a lower affinity for the antifouling liquid 3 than the liquid retaining portion.

The liquid ejecting portion 22, which is disposed at the inner part of the microporous layer 2 and has a lower affinity for the antifouling liquid 3 than the liquid retaining portion 21, facilitates movement of the antifouling liquid 3 retained in the pores 20 of the microporous layer from the liquid ejecting portion 22 at the inner part of the microporous layer 2 to the liquid retaining portion 21 in the surface.

When the antifouling liquid 3 is supplied to the liquid retaining portion 21 in the surface of the microporous layer, the antifouling liquid 3 wets the entire surface of the microporous layer 2 since the liquid retaining portion 21 has higher affinity for the antifouling liquid. The self-restoring antifouling film 31 is thus formed to improve the antifouling effect.

The film thickness (X) of the liquid retaining portion is within the range of 1/100 to 1/50 of the film thickness (T) of the liquid ejecting portion. In other words, the film thickness (X) of the liquid retaining portion is within the range of 1/101 to 1/51 of the depth (h) of the pores of the microporous layer.

When the film thickness (X) of the liquid retaining portion is less than 1/100 of the film thickness (T) of the liquid ejecting portion, the pores 20 of the microporous layer is less likely to be filled with the antifouling liquid 3. The amount of antifouling liquid retained in the microporous layer 2 is decreased, and the antifouling liquid 3 is depleted soon.

When the film thickness (X) is greater than 1/50, the film thickness of the liquid ejecting portion is too thin. This results in the decreased force of repelling and pushing out the antifouling liquid from the pores. The antifouling liquid is not supplied to the surface of the microporous material, and the antifouling liquid retained in the microporous layer is not sufficiently used.

For example, the liquid retaining portion can be formed by modifying the microporous layer with a known fluorine surface modifier such as an alkoxy oligomer having a fluorine functional group. Such fluorine surface modifiers include fluorine silane coupling agents known in the art.

The film thickness of the liquid retaining portion can be adjusted by changing the aperture size of the microporous layer, changing the pressure of immersion in the surface modifier, wiping with a cloth and the like.

The microporous structural layer, which is made of a metal oxide or the like, typically does not have water-repellency. Further, since the microporous layer has an uneven surface, it has higher surface free energy than a flat layer.

Accordingly, the microporous layer has poor wettability to a surface modifying liquid containing the fluorine surface modifier. Since the microporous layer repels the surface modifying liquid, the inner part of the pores of the microporous structural layer is not modified. The liquid retaining portion can be formed by applying a pressure to force the surface modifying liquid to penetrate into the pores.

Then, the film thickness of the liquid retaining portion can be adjusted by wiping the thick film of the surface modifier on the surface with a cloth or the like.

Assuming the pores of the microporous structural layer are capillaries, the depth (H) of liquid penetrating into a pore is represented by the following Equation (1).

$$H = 2T \cos \theta / \rho g r \qquad \text{Equation (1)}$$

In Equation (1), H: penetrating depth of liquid, surface tension, $\theta$: contact angle, $\rho$: density of liquid, g: gravity acceleration, r: inner size (radius) of pore.

When $\theta \geq 90°$, the liquid cannot penetrate into the capillary. However, by applying a pressure, the liquid penetrates into the capillary.

The film thickness of the liquid retaining portion can be determined by elemental analysis of the microporous layer.

When a target element increases the affinity for the antifouling liquid, e.g. when the antifouling liquid is fluorine oil, the fluorine elements present in the microporous layer can be detected by elemental analysis based on X-ray photoelectron spectroscopy (XPS) (target elements: carbon, oxygen, fluorine, silicon).

Specifically, the microporous layer is subjected to elemental analysis based on X-ray photoelectron spectroscopy while the microporous layer is being etched with argon gas, and the concentration distribution of fluorine element in the layer thickness (depth) direction is calculated. It can be concluded that the liquid retaining layer is formed in the area in the layer thickness (depth) direction in which the fluorine element concentration is equal to or greater than 3 mol %.

Whether a fluorine surface modifier, e.g. a fluorine functional group such as fluoroalkyl group, modifies the pores of the microporous layer to form the liquid retaining portion can be determined, for example, by time-of-flight secondary ion mass spectroscopy.

With regard to the surface free energy of the liquid retaining portion, it is preferred that the difference from the surface free energy of the antifouling liquid is equal to or less than 10 mJ/m$^2$.

When the difference from the surface free energy of the antifouling liquid is equal to or less than 10 mJ/m$^2$, the affinity for the antifouling liquid is improved. This allows the antifouling liquid to wet the entire surface of the microporous layer. This can also increase the amount of antifouling liquid retained in the microporous layer.

As a result, the antifouling film is highly durable since it is self-restorable for a long time.

With regard to the surface free energy of the liquid ejecting portion, the difference from the surface free energy of the antifouling liquid is preferably within the range of 30 mJ/m$^2$ to 200 mJ/m$^2$.

When the difference from the surface free energy of the antifouling liquid is equal to or greater than 30 mJ/m$^2$, the liquid ejecting portion moderately repels the antifouling liquid to push it out to the liquid retaining portion. Accordingly, the antifouling liquid is readily supplied to the surface of the microporous layer. When the difference is greater than 200 mJ/m$^2$, the antifouling liquid is less likely to penetrate into the liquid retaining portion. Accordingly, the amount of antifouling liquid retained may be decreased.

Measurement of Surface Free Energy

The surface free energy in the pores of the microporous layer cannot be directly measured. However, it can be measured by putting a droplet of liquid having known surface free energy on a smooth surface of a material having the same composition and measuring the contact angle thereof.

In the present invention, a droplet of water or diiodomethane is put on a smooth base, and the surface free energy is determined from the contact angle thereof according to the Owens-Wendt method.

The pore volume ratio of the microporous layer is preferably within the range of 5% to 60%. When the pore volume ratio is less than 5%, the amount of antifouling liquid retained is small. Since the antifouling liquid is readily depleted, the antifouling film may not be maintained for a long time. When the pore volume ratio is greater than 60%, the strength of the microporous layer is decreased, and the abrasion resistance of the microporous layer may be decreased.

The pore volume ratio can be adjusted by changing the amount of phase separating agent or catalyst in the formation of the microporous layer.

The thickness of the microporous layer is preferably within the range of 50 nm to 400 mm. When the thickness of the microporous layer is less than 50 nm, the amount of antifouling liquid retained is decreased and the durability of the antifouling structure is decreased. When the thickness is greater than 400 nm, a crack is readily formed. Further, the haze may be increased.

For example, the thickness of the microporous layer can be adjusted by changing the dilution ratio (viscosity) of a microporous layer coating solution and the coating speed.

The average aperture size (D) of the microporous layer is preferably within the range of 10 nm to 400 nm/n, where n is the refractive index of the material of the microporous layer.

When the average aperture size is less than 10 nm, it is difficult, for example, for a fluorine surface modifier to penetrate into the pores. It may be therefore difficult to retain a certain type of antifouling liquid such as fluorine oil.

When the average aperture size is greater than 400 nm/n, the haze is increased or the all-optical transmittance decreased due to Rayleigh scattering and the like.

To determine the average aperture size (D), surface apertures of the microporous layer are observed from above under a scanning electron microscope (SEM), the apertures are converted into circles having the same area by image analysis, and the average diameter of the circles (e.g. reference signs d1 to d3 in FIG. 2) can represent the average particle size (D).

To determine the refractive index (n) of the material of the microporous layer, for example, the refractive index of a film of the material having the same composition can be measured by an Abbe refractometer.

As for the surface-modified microporous layer, for example, a film of the material having the same composition is subjected to the same surface treatment, and the refractive index of the film can be measured by an Abbe refractometer.

For example, the average aperture size (D) of the microporous layer can be adjusted by changing the time immediately after coating the material of the microporous structure onto a base until drying it by heat in the production of the microporous structural layer or changing the applied film thickness in the production of the microporous structural layer.

Specifically, the aperture size (D) of the microporous structural layer can be increased by extending the time after coating until drying by heat or increasing the applied film thickness in the production of the porous layer.

The pores of the microporous layer may have any shape that can retain the antifouling liquid, such as a plurality of three-dimensionally and randomly arranged voids that are communicated with each other, cylinders that are opened in the surface of the microporous layer and the like. It is preferred that a plurality of voids are three-dimensionally and randomly arranged. When the pore shape is three-dimensionally and randomly arranged voids, the mechanical strength is high.

The material of the microporous layer is not particularly limited. In terms of improving the resistance to sliding abrasion of the microporous layer and improving the durability of the antifouling structure, it is preferred to use an inorganic material.

Examples of such inorganic materials include simple oxides such as silicon oxide, aluminum oxide, magnesium oxide, titanium oxide, cerium oxide, niobium oxide, zirconium oxide, indium oxide, tin oxide, zinc oxide and hafnium oxide, complex oxides such as barium titanate, non-oxides such as silicon nitrate and magnesium fluoride, glass, and the like.

They may be used alone or in combination of two or more.

Among them, silicon oxide, aluminum oxide, titanium oxide, indium oxide, tin oxide and zirconium oxide are preferred since they have high light transmittance.

Antifouling Liquid

The antifouling liquid forms an antifouling film on the surface of the microporous layer to repel foreign matters such as water, oil, sand, dust and the like so as to reduce adhesion of the foreign matters. The antifouling liquid may be any liquid that has water repellency or oil repellency. Examples of such antifouling liquid include fluorine oil.

Such fluorine oils include fluoropolyether oil, perfluoropolyether oil and the like.

The antifouling liquid has a viscosity at 20° C. of preferably 160 $m^2$/s or less, more preferably from 8 $mm^2$/s to 80 $mm^2$/s.

When the viscosity of the antifouling liquid is greater than 160 $mm^2$/s, the heat resistance (resistance to runoff) is increased while the water repellency and the antifouling effect may be decreased. When the viscosity is less than 8 $mm^2$/s, the low viscosity at high temperature may result in the decreased heat resistance.

Regarding the viscosity of the antifouling liquid, the evaporation loss at 120° C. after 24 hours is preferably less than 35 mass %. When the evaporation loss is less than 35 mass %, the antifouling structure can have good durability.

For example, in an automobile usage, deterioration of the performance due to natural evaporation of the antifouling liquid is less likely to occur, and the antifouling effect can be maintained for a long time around ordinary temperature (5° C. to 35° C.).

The evaporation loss can be determined by spreading 30 g of the antifouling liquid on a 40φ petri dish and heating it at 120° C. for 24 hours.

Base

The antifouling structure of the present invention may comprise a base on the opposite side of the microporous layer from the liquid retaining portion.

The base may be made of an inorganic material such as glass or a steel plate. Further, the base may contain an organic material such as a resin mold or a coating film.

Method of Producing Antifouling Structure

In a method of producing the antifouling structure of the present invention, the microporous layer is formed by a sol-gel method in a first step. Specifically, the microporous layer can be formed by turning a solution containing the material of the microporous layer into a sol by hydrolysis and polymerization, applying the sol onto the base or the like, allowing the reaction to further proceed to turn the sol into gel, and drying and calcining it.

For example, the sol can be applied by a method known in the art such as spin coating, spraying, a roll coater, flow coating or dip coating.

Then, the pores of the microporous layer are modified with a surface modifier, and the microporous layer is impregnated with the antifouling liquid such as a fluorine oil.

Automobile Part

The automobile part of the present invention comprises the antifouling stricture of the present invention. With the antifouling structure, the automobile part can maintain high antifouling effect for a long time. Accordingly, it can reduce the frequency of car wash or cleaning and secure a good view in a rain or on a dirt road.

Such automobile parts include camera lenses, mirrors, glass windows, painted surfaces of bodies and the like, various light covers, door handles, meter panels, window panels, radiator fins, evaporators and the like. However, the automobile part is not limited thereto.

EXAMPLES

Hereinafter, the present invention will be described in more detail with examples.

Example 1

Preparation of Coating Solution

Water (50 mmol), 11 mmol of triethylene glycol and 13 mmol of isopropanol were homogenously mixed, and 0.2 g of 32-N sulfuric acid was added thereto to prepare Solution A.

Then, 54 mmol of tetraethoxy silane and 13 mmol of isopropanol were mixed to prepare Solution B.

Solution A and Solution B were mixed together and stirred with a stirrer for 15 minutes to prepare a sol. The sol was diluted 5-fold with ethanol to prepare a coating solution.

Coating

The coating solution is applied onto a soda lime glass by spin coating (spinning speed: 2000 rpm, spinning time: 20 seconds, humidity: 60%).

Pre-Calcining

Within 1 minute after coating, the coated glass plate was placed in a dry oven heated at 150° C. and dried for 1 hour, and thereafter allowed to cool to room temperature (25° C.) in the dry oven, so that the sample was pre-cured.

Calcining

Thereafter, the pre-cured sample was heated at 500° C. in a muffle furnace for 1 hour and then allowed to cool to room temperature (25° C.) in the muffle furnace. A microporous layer having a micro uneven structure was thus formed, in which a plurality of mutually communicated voids are three-dimensionally and randomly arranged.

Formation of Liquid Retaining Portion

The soda lime glass with the microporous layer was immersed in a fluorine based silane coupling agent (FLUOROSURF FG-5020, Fluoro Technology Corp.) for 48 hours, transferred to a dry oven and dried at 150° C. for 1 hour. A liquid retaining portion was thus formed in the surface of the microporous layer.

Application of Oil

The amount of fluorine oil (perfluoropolyether oil, KRYTOX GLP 103, Du Pont Corp, surface free energy: 17 mJ/m$^2$) required for forming 500 nm-thick oil film was weighed, and a BEMCOT was impregnated with the fluorine oil. The fluorine oil was applied onto the microporous layer with the liquid retaining portion. An antifouling structure was thus produced.

Example 2

An antifouling structure was produced in the same manner as Example 1 except that the spinning speed of the spin coating was changed to 1500 rpm.

Example 3

An antifouling structure was produced in the same manner as Example 1 except that the spinning speed of the spin coating was changed to 700 rpm.

Example 4

An antifouling structure s produced in the same manner as Example 1 except that the coating solution was changed to the following solution, and the spinning speed of the spin coating was changed to 500 rpm.

Coating Solution

Water (50 mmol), 11 mmol of triethylene glycol and 13 mmol of isopropanol were homogenously mixed, and 1.0 g of 32-N sulfuric acid was added thereto to prepare Solution A.

Then, 54 mmol of tetraethoxy silane and 13 mmol of isopropanol were mixed to prepare Solution B.

Solution A and Solution B were mixed together and stirred with a stirrer for 15 minutes to prepare a sol. The sol was diluted 5-fold with ethanol to prepare a coating solution.

Example 5

An antifouling structure was produced in the same manner as Example 1 except that the coating solution was changed to the following solution.

Coating Solution

Water (50 mmol), 20 mmol of triethylene glycol and 13 mmol of isopropanol were homogenously mixed, and 0.2 g of 32-N sulfuric acid was added thereto to prepare Solution A.

Then, 54 mmol of tetraethoxy silane and 13 mmol of isopropanol were mixed to prepare Solution B.

Solution A and Solution B were mixed together and stirred with a stirrer for 15 minutes to prepare a sol. The sol was diluted 5-fold with ethanol to prepare a coating solution.

Comparative Example 1

An antifouling structure was produced in the same manner as Example 1 except that the microporous layer was changed to a microporous film (3M Corp.).

Comparative Example 2

An antifouling structure was produced in the same manner as Example 1 except that no liquid retaining portion a formed.

Comparative Example 3

An antifouling structure was produced in the same manner as Example 1 except that the time for the surface modifying treatment in the formation of the liquid retaining portion was changed from 48 hr. to 72 hr.

The configuration of the antifouling structures of Example 1 to Example 5 and Comparative Example 1 to Comparative Example 3 are shown in Table 1.

TABLE 1

| | Aperture Size (nm) | Pore Volume (%) | Film Thickness of Microporous Layer (nm) | Surface Free Energy of Liquid Retaining Portion (mJ/m2) | Depth of Surface Modification (nm) |
|---|---|---|---|---|---|
| Example 1 | 30 | 18 | 101 | 11 | 1 |
| Example 2 | 55 | 13 | 203 | 11 | 3 |
| Example 3 | 52 | 25 | 306 | 11 | 6 |
| Example 4 | 100 | 22 | 384 | 11 | 4 |
| Example 5 | 42 | 55 | 102 | 11 | 2 |
| Comparative Example 1 | 1000 | 50 | 10000 | 19 | 10000 |
| Comparative Example 2 | 30 | 20 | 100 | none | none |
| Comparative Example 3 | 45 | 15 | 207 | 11 | 7 |

| | Film Thickness of Liquid Retaining Portion/Film Thickness of Microporous Layer | Surface Free Energy of Liquid Ejecting Portion (mJ/m2) | Film Thickness of Liquid Ejecting Portion (nm) | Film Thickness of Liquid Retaining Portion/Film Thickness of Liquid Ejecting Portion | Material of Porous Layer |
|---|---|---|---|---|---|
| Example 1 | 1/101 | 176 | 100 | 1/100 | SiO2 |
| Example 2 | 3/203 | 165 | 200 | 3/200 | SiO2 |
| Example 3 | 6/306 | 132 | 300 | 6/300 | SiO2 |
| Example 4 | 4/384 | 102 | 380 | 4/380 | SiO2 |
| Example 5 | 2/102 | 187 | 100 | 2/100 | SiO2 |
| Comparative Example 1 | 10000/10000 | none | 10000 | 0 | PTFE |
| Comparative Example 2 | 0 | 155 | 100 | 0 | SiO2 |
| Comparative Example 3 | 7/207 | 164 | 200 | 7/200 | SiO2 |

The antifouling structure of Example 1 to Example 5 and Comparative Example 1 to Comparative Example 3 were evaluated by the following methods.

The evaluation results are shown in Table 2.

Abrasion Resistance

After sliding movement against a canvas cloth for predetermined times, the water droplet sliding angle was measured with a full-automatic contact angle meter (Drop Master, Kyowa Interface Science, Co., Ltd.).

A: The sliding angle of a 20-μL water droplet was equal to or less than 10°.

B: The sliding angle of a 20-μL water droplet was greater than 10° and equal or less than 20°.

C: The sliding angle of a 20-μL water droplet was greater than 20° and equal or less than 30°.

D: A 20-μL water droplet stayed over 30°.

Heat Resistance

The laminated structures were stuck on a glass stand at an angle of 80 degrees and placed in an oven at 90° for 4 hours and then at ordinary temperature for 1 hour, and the sliding angle of a water droplet (5 μL) was measured.

A: The sliding angle of a 20-μL water droplet was equal to or less than 10°.

B: The sliding angle of a 20-μL water droplet was greater than 10° and equal or less than 20°.

C: The sliding angle of a 20-μL water droplet was greater than 20° and equal or less than 30°.

D: A 20-μL water droplet stayed over 30°.

Optical Characteristics

The haze and the all-optical transmittance were measured according to JIS K 7136 with a haze/transmittance meter and a haze meter (Murakami Color Research Laboratory).

TABLE 2

| | Abrasion Resistance | | Heat Resistance Test | Haze (%) | All-optical transmittance (%) |
|---|---|---|---|---|---|
| | 1000 times | 5000 times | | | |
| Example 1 | A | A | A | 0.5 | 93 |
| Example 2 | A | A | A | 0.4 | 93 |
| Example 3 | A | A | A | 0.7 | 94 |
| Example 4 | A | A | A | 0.9 | 92 |
| Example 5 | A | B | A | 0.3 | 93 |
| Comparative Example 1 | B | D | B | 80 | 30 |
| Comparative Example 2 | D | D | D | 0.5 | 94 |
| Comparative Example 3 | B | C | C | 0.4 | 94 |

As seen from Table 1 and Table 2, the antifouling structure of the present invention had high abrasion resistance and high heat resistance. The antifouling structure of Comparative Example 1 had large pore volume and was capable of retaining a large amount of antifouling liquid. However, since the microporous layer had high affinity for the antifouling liquid, the antifouling liquid did not exude from the pores. Therefore, the abrasion resistance was low.

In Comparative Example 2, the antifouling liquid did not penetrate into the microporous layer since it did not have any liquid retaining portion. Therefore, it retained a small amount of antifouling liquid, and the abrasion resistance was low. A comparison between Comparative Example 2 and Example 1 revealed that the liquid retaining portion increases the amount of antifouling liquid retained.

Comparative Example 3, which had the liquid retaining portion, exhibited a better result than Comparative Example 1 and Comparative Example 2 in abrasion resistance. However, the thick film of the liquid retaining portion weakened the force of the liquid ejecting portion for pushing out the antifouling liquid. Therefore, the abrasion resistance after 5000 times was low.

While the present invention is described with examples, the present invention is not limited to these examples, and various changes can be made within the features of the present invention.

For example, in the above-described embodiment, an automobile part is exemplified as an article to which the antifouling structure is applied. However, the present invention is not limited thereto, and the antifouling structure is also applicable, for example, to motorcycle components, mobile devices such as cellphones and electric notebooks, signboards, timepieces and the like.

REFERENCE SIGNS LIST

1 Antifouling structure
2 Microporous layer
20 Pores
21 Liquid retaining portion
211 Surface modified layer
22 Liquid ejecting portion
3 Antifouling liquid
31 Antifouling film
d1 to d3 Aperture size
h Pore depth
T Film thickness of liquid ejecting portion
X Film thickness of liquid retaining portion

The invention claimed is:

1. An antifouling structure, comprising: a microporous layer; and an antifouling liquid retained at a surface part of the microporous layer and at an inner part of the microporous layer,
   wherein the microporous layer comprises a liquid retaining portion that is formed in a film shape at the surface part of the microporous layer and retains the antifouling liquid; and a liquid ejecting portion that is formed in a film shape at the inner part of the microporous layer and has lower affinity for the antifouling liquid than the liquid retaining portion, and
a film thickness of the liquid retaining portion is within the range of 1/100 to 1/50 of a film thickness of the liquid ejecting portion.

2. An antifouling structure, comprising: a microporous layer; and an antifouling liquid retained at a surface part of the microporous layer and at an inner part of the microporous layer,
   wherein the microporous layer comprises a liquid retaining portion that is formed in a film shape at the surface part of the microporous layer and retains the antifouling liquid; and a liquid ejecting portion that is formed in a film shape at the inner part of the microporous layer and has lower affinity for the antifouling liquid than the liquid retaining portion, and
the film thickness of the liquid retaining portion is within the range of 1/101 to 1/51 of a depth of pores of the microporous layer.

3. The antifouling structure according to claim 1, wherein a difference in surface free energy between the liquid retaining portion and the antifouling liquid is equal to or less than 10 $mJ/m^2$, and a difference in surface free energy between the liquid ejecting portion and the antifouling liquid is equal to or greater than 30 $mJ/m^2$.

4. The antifouling structure according to claim 1, wherein a pore volume ratio of the microporous layer is within the range of 5% to 60%.

5. The antifouling structure according to claim 1, wherein a film thickness of the microporous layer is within the range of 50 nm to 400 nm.

6. The antifouling structure according to claim 1, wherein an average aperture size (D) of the microporous layer is within the range of 10 nm to 400 nm/n,
   where n is a refractive index of the microporous layer.

7. The antifouling structure according to claim 1, wherein a viscosity of the antifouling liquid at 0° C. is equal to or less than 160 $mm^2/s$.

8. The antifouling structure according to claim 1, wherein an evaporation loss of the antifouling liquid at 120° C. after 24 hours is less than 35%.

9. An automobile part, comprising the antifouling structure according to claim 1.

* * * * *